US010128711B2

(12) United States Patent
Knight (10) Patent No.: US 10,128,711 B2
(45) Date of Patent: Nov. 13, 2018

(54) STATOR ASSEMBLY FOR AN ELECTRIC SUPERCHARGER (71) Applicant: Valeo Air Management UK Limited, Redditch (GB)

(72) Inventor: Stephen Michael Knight, Basildon (GB)

(73) Assignee: Valeo Air Management UK Limited, Redditch (GB)

( * ) Notice: Subject to any disclaimer, the term of this patent is extended or adjusted under 35 U.S.C. 154(b) by 601 days.

(21) Appl. No.: 14/764,315

(22) PCT Filed: Jan. 31, 2014

(86) PCT No.: PCT/GB2014/050266
§ 371 (c)(1),
(2) Date: Jul. 29, 2015

(87) PCT Pub. No.: WO2014/118557
PCT Pub. Date: Jul. 8, 2014

(65) Prior Publication Data
US 2015/0372553 A1    Dec. 24, 2015

(30) Foreign Application Priority Data
Feb. 1, 2013    (GB) .................................. 1301793.4

(51) Int. Cl.
*H02K 3/52* (2006.01)
*H02K 3/28* (2006.01)
(Continued)

(52) U.S. Cl.
CPC ............... *H02K 3/28* (2013.01); *F02B 33/40* (2013.01); *F02B 39/10* (2013.01);
(Continued)

(58) Field of Classification Search
CPC .. H02K 3/50; H02K 3/521–3/525; H02K 3/52
See application file for complete search history.

(56) References Cited

U.S. PATENT DOCUMENTS

2002/0062548 A1    5/2002   Ketterer et al.
2002/0084716 A1    7/2002   Harter et al.
(Continued)

FOREIGN PATENT DOCUMENTS

CN    101088207 A    12/2007
EP      1830453 A1     9/2007
(Continued)

OTHER PUBLICATIONS

International Search Report issued in PCT/GB2014/050266 dated Feb. 11, 2015 (2 pages).
(Continued)

*Primary Examiner* — Ramon M Barrera
(74) *Attorney, Agent, or Firm* — Osha Liang LLP (57) ABSTRACT An electric supercharger comprises a motor, for example a switched reluctance motor. The motor includes a stator assembly (101) comprising a plurality of pairs of windings (103A-C), each pair of windings (103A-C) comprising a first winding for forming a first pole and a second winding for forming a second, opposite, pole, each winding having an input termination (105) and an output termination (107). The terminations (105, 107) of each pair of windings (103A-C) are arranged such that the input terminations (105) for the first and second windings are located adjacent one another and the output terminations (107) of the first and second windings are located adjacent one another.

11 Claims, 10 Drawing Sheets (51) Int. Cl.
*F02B 39/10* (2006.01)
*H02K 1/14* (2006.01)
*F02B 33/40* (2006.01)
*F04D 25/06* (2006.01)
*H02K 1/24* (2006.01)
*H02K 11/33* (2016.01)

(52) U.S. Cl.
CPC ......... *F04D 25/0693* (2013.01); *H02K 1/148* (2013.01); *H02K 1/246* (2013.01); *H02K 3/52* (2013.01); *H02K 3/521* (2013.01); *H02K 3/522* (2013.01); *H02K 11/33* (2016.01); *H02K 2213/12* (2013.01)

(56) References Cited

U.S. PATENT DOCUMENTS

| | | |
|---|---|---|
| 2002/0134082 A1 | 9/2002 | Bolz et al. |
| 2003/0102765 A1 | 6/2003 | Knoll et al. |
| 2009/0127964 A1 | 5/2009 | Yumoto et al. |
| 2010/0295394 A1 | 11/2010 | Sahara et al. |
| 2012/0262014 A1 | 10/2012 | Katou et al. |

FOREIGN PATENT DOCUMENTS

| | | |
|---|---|---|
| JP | 2945227 B2 | 9/1999 |
| JP | 2001-28851 A | 1/2001 |
| WO | 2010136966 A2 | 12/2010 |

OTHER PUBLICATIONS

Written Opinion of the International Searching Authority issued in PCT/GB2014/050266 dated Feb. 11, 2015 (7 pages).
Communication from the Examining Division and Annex to the Communication issued in corresponding Europen Patent Application No. 14 703 166.0, dated Feb. 9, 2017 (5 pages).
United Kingdom Search Report issued in corresponding United Kingdom Application No. 1301793.4 dated Jul. 9, 2013 (2 pages).
The First Office Action issued in corresponding Chinese Patent Application No. 201480007274.1, dated Jun. 2, 2017 (14 pages).

STATOR ASSEMBLY FOR AN ELECTRIC SUPERCHARGER

TECHNICAL FIELD

The present invention relates to a electric supercharger, and particularly an electric supercharger comprising a motor having a stator assembly.

BACKGROUND OF THE INVENTION

Figure 1A:
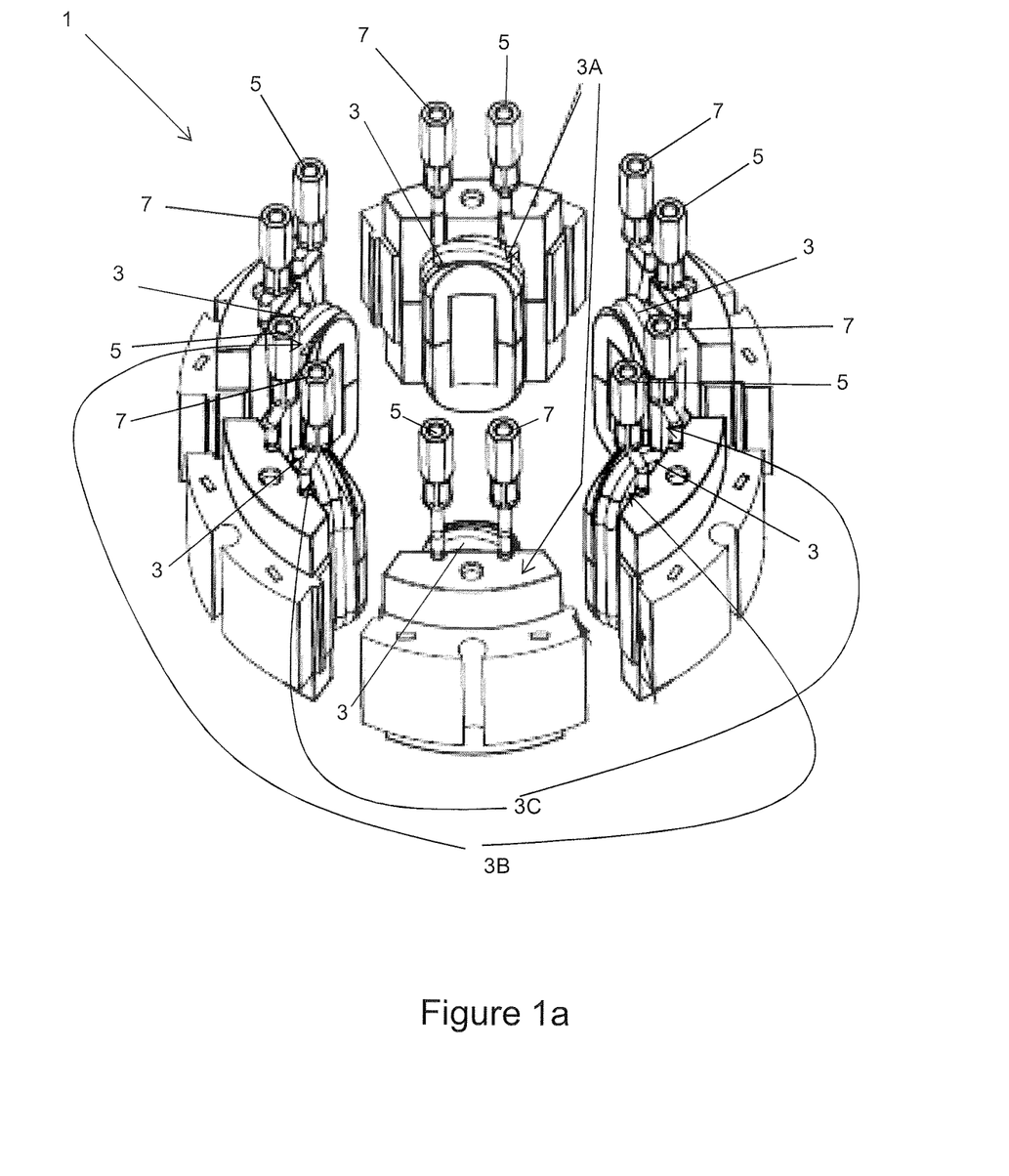
FIG. 1a is a partially exploded perspective view of a stator assembly in an electric supercharger from which the invention has been developed.
Figure 1B:
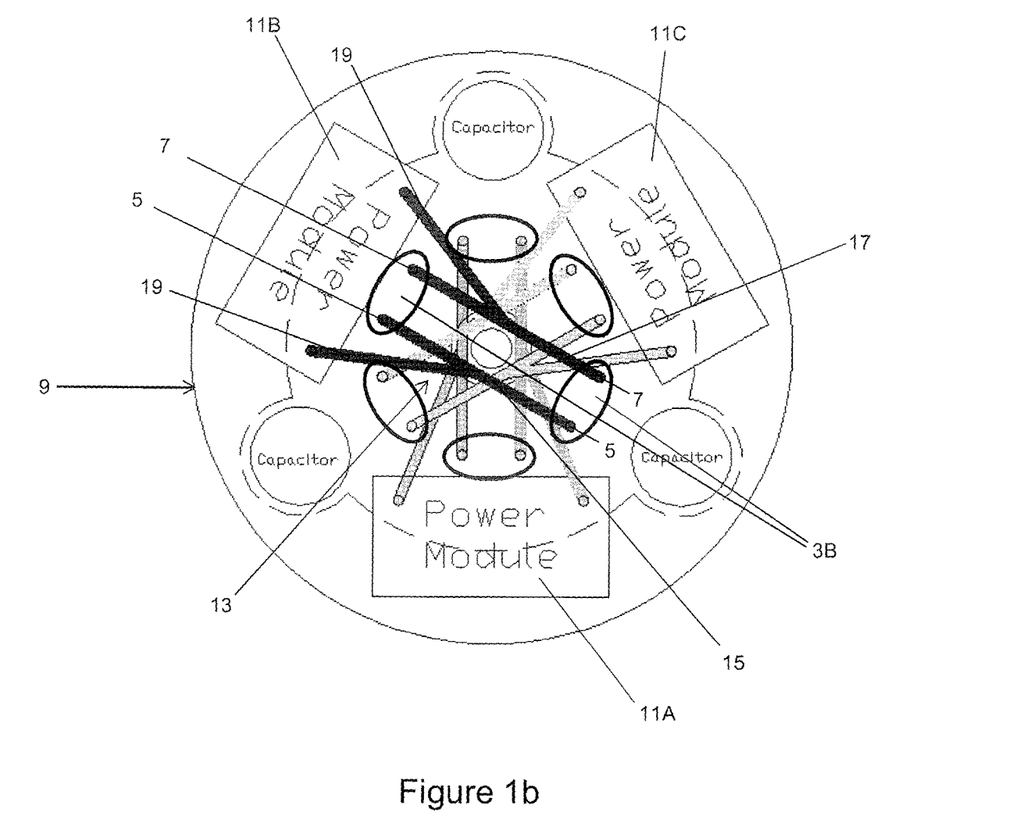
FIG. 1b is a schematic plan view of the stator assembly of FIG. 1a, also showing a control module.

FIGS. 1a and 1b show a stator assembly for an electric supercharger from which the invention has been developed. The electric supercharger (not shown) comprises a switched reluctance motor. The stator assembly 1 of the motor has six windings 3 arranged in three pairs (each pair comprising two windings 3A, 3B, 3C opposite one another for forming opposing poles). Each winding 3 is a coil of wire that is wrapped around a metallic core. Each winding 3 has an input termination 5 and an output termination 7 associated with it. These terminations are connectable to an energising source (not shown in FIG. 1a). In the stator assembly of FIGS. 1a and 1b, the terminations 5, 7 extend directly above each respective winding 3. The terminations 5, 7 are therefore arranged in a ring (formed of twelve terminations, in sequential pairs of input terminations 5 and output terminations 7 above each respective winding 3).

To control the energising of the windings, the stator assembly comprises a control module (indicated in general terms by reference numeral 9 and shown in FIG. 1b). The control module 9 includes a microprocessor (not shown) for determining and controlling the sequence of energising the windings 3, three power control modules 11A, 11B, 11C each being arranged to supply power to one of the pairs of windings 3A, 3B, 3C, and tracking 13 to connect each pair of windings 3A, 3B, 3C, to a respective power control module 11A, 11B, 11C. For the sake of clarity, only elements relating to one pair of windings 3B are shown in FIG. 1b (with the exception of all three power control modules 11A-C).

The tracking 13 (shown only in simplified form in FIG. 1b) is formed of three PCB layers stacked above one another, each layer being associated with a respective pair of windings 3A-C. Each layer has a first track 15 connecting together the input terminations 5 of a pair of windings, a second track 17 connecting together the output terminations 7 of the same pair of windings, and additional tracks 19 linking the I/O terminals of the respective power module 11A-C with the first and second tracks 15, 17.

Such a tracking arrangement is complex and may therefore add cost to the control module. Furthermore, the tiered tracking results multiple layers of PCB and therefore in a relatively thick control module which can be undesirable from a cost perspective and/or from the perspective of the PCB's interaction with surrounding components of the supercharger.

SUMMARY OF THE INVENTION

The present invention seeks to remove or mitigate at least some of the above-mentioned drawbacks.

According to a first aspect of the present invention there is provided an electric supercharger comprising a motor, the motor including a stator assembly comprising a plurality of pairs of windings, each pair of windings comprising a first winding for forming a first pole and a second winding for forming a second, opposite, pole, each winding having an input termination and an output termination, and characterised in that the terminations of each pair of windings are arranged such that the input terminations for the first and second windings are located adjacent one another and the output terminations of the first and second windings are located adjacent one another. By arranging the input terminations for the first and second windings adjacent one another and the output terminations of the first and second windings adjacent one another, the need for complex layers of tracking may be removed. The invention recognises that, in effect, the wires extending from the windings can replace the tracking, to provide an improved solution.

The input termination is the termination through which current is arranged to flow into the winding. The output termination is the termination through which current is arranged to flow out of the winding. For example there may be a voltage drop from the input termination to the output termination.

The first pole may, for example, be a south pole and the second pole may be a north pole (or vice versa). It will be appreciated that the pole formed by each winding is dependent on the direction of the winding and/or the direction of the current flow through the winding.

In principle, the first and second windings could be in any number of different relative positions. However, in more preferable embodiments of the invention, the first and second windings are located opposite one another.

The two pairs of terminations for each pair of windings may be remote from one another (for example over opposite sides of the stator assembly). More preferably however, the two pairs of terminations for each pair of windings are located adjacent to each other. Such an arrangement may facilitate a straightforward electrical connection (by, for example, a power module) to both the input terminations and the output terminations of the pair of windings without requiring excessive tracking or other electrical connectors to reach one or both pairs of terminations. It will be appreciated that the two pairs of terminations for each pair of windings may be adjacent whilst still being spaced part to some degree. The two pairs of terminations for each pair of windings are preferably arranged sequentially around the stator assembly. For example, when moving round the stator assembly, one may encounter the pair of input terminations and the pair of output terminations for a first pair of windings, and then the pair of input terminations and the pair of output terminations for a second pair of windings, and so on for any remaining pairs of windings in the plurality of pairs of windings. The two pairs of terminations for each pair of windings preferably do not overlap in a circumferential direction. The pairs of terminations may be remote from the pair of windings with which they are associated.

The terminations in each pair of terminations for the first and second windings are adjacent to one another. It will be appreciated that these terminations are adjacent even if spaced apart to some degree. However, in some embodiments of the invention, there may be substantially no gap between the terminations in each pair of terminations, such that the terminations (in each pair of terminations for the first and second windings) are directly adjacent to one another. The terminations in each pair of terminations for the first and second windings may be electrically shorted. Thus, the first and second windings are preferably connected in parallel. The terminations in each pair of terminations may be shorted by virtue of the terminations being hardwired together, but more preferably, the terminations are shorted by an intermediate electrical connector linking the pair of terminations (for example when a control module is installed in the supercharger).

The motor may be a reluctance motor, is preferably a variable reluctance motor and is more preferably a switched reluctance motor (SRM). The motor may include a control module for controlling the energising of each of the pairs of windings in the stator assembly. For example the control module may selectively energise the pairs of windings to generate a changing, and preferably a rotating, magnetic field. The control module may be arranged to selectively energise more than one pair of windings at any one time. The control module may comprise a plurality of power modules, each power module being arranged to power one of the pairs of windings. The waveform of the signal received by each pair of windings may be the same. The signals received by each pair of windings may be at least partially out of phase with one another.

In embodiments comprising a plurality of power modules, the pairs of input and/or output terminations in each pair of windings may be adjacent to one another such that each pair of terminations can be connected to the power module via a single connection (e.g. with no intervening track). The input and output terminations for each pair of windings may therefore be readily accessed. There is preferably no overlap of the connections between one power module and its input and output terminations, and the connections between another power module and its respective input and output terminations.

Each winding is preferably in the form of a coil of wire. The winding may be wrapped around a core.

The windings are preferably arranged in a circle. The first and the second windings in each pair may be diametrically opposite one another. The input and output terminations for each winding may be on the end of respective input and output wires to/from the winding. The input and output wires of each winding may extend in a substantially circumferential direction such that the termination is circumferentially remote from its respective winding. The terminations within a pair of adjacent terminations are preferably located within a sector of less than 10 degrees, and more preferably less than 5 degrees, of the circle.

The terminations are preferably positioned radially inwardly of the windings.

The stator assembly may comprise a multiplicity of pairs of windings. The stator assembly may comprise three pairs of windings.

According to another aspect of the invention, there is provided a stator assembly for use in an electric supercharger, the stator assembly comprising a plurality of pairs of windings, each pair of windings comprising a first winding for forming a first pole and a second winding for forming a second, opposite, pole, each winding having an input termination and an output termination, and characterised in that the terminations of each pair of windings are arranged such that the input terminations for the first and second windings are located adjacent one another and the output terminations of the first and second windings are located adjacent one another. The stator assembly is preferably for use in the electric supercharger as described herein with reference to the first aspect of the invention.

According to another aspect of the invention, there is provided an internal combustion engine in combination with the electric supercharger as described herein with reference to the first aspect of the invention.

Any features described with reference to one aspect of the invention are equally applicable to any other aspect of the invention, and vice versa. For example, any features described with reference to the electric supercharger of the first aspect of the invention are equally applicable to the stator assembly of the second aspect of the invention.

DESCRIPTION OF THE DRAWINGS

Various embodiments of the invention will now be described, by way of example only, with reference to the accompanying schematic drawings of which.

DETAILED DESCRIPTION

FIGS. 1a and 1b show a stator assembly in an electric supercharger from which the invention has been developed. As explained above, the stator assembly comprises a control module including tracking 13 to connect each pair of windings 3A, 3B, 3C, to a respective power control module 11A, 11B, 11C. The tracking 13 (shown in simplified form in FIG. 1b) is formed of three PCB layers stacked above one another, each layer being associated with a pair of windings 3A-C. Such a tracking arrangement is complex and may therefore add cost to the stator assembly. Furthermore, the tiered tracking results in a relatively thick PCB which can be undesirable from a cost perspective and/or the PCB's interaction with surrounding components of the supercharger.

Figure 2:
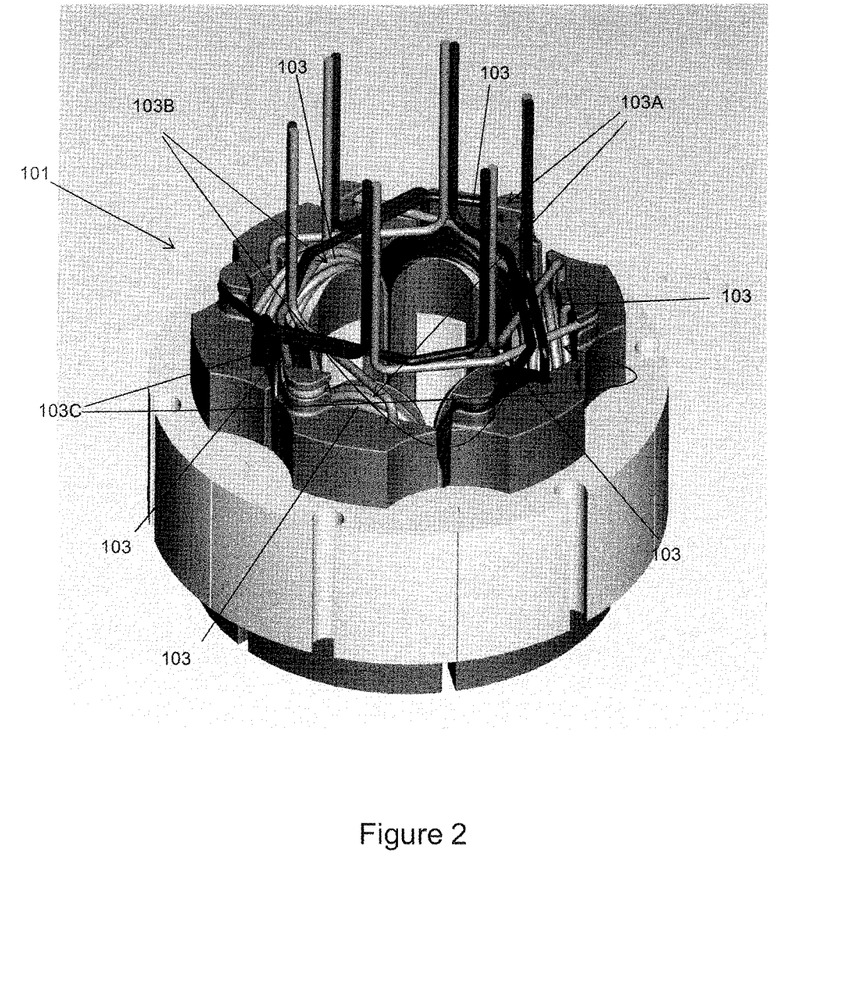
FIG. 2 is a perspective view of a stator assembly according to a first embodiment of the invention.

FIG. 2 shows a stator assembly 101 according to a first embodiment of the invention. The stator assembly 101 comprises six windings 103 arranged in a circle. Each winding is formed by a coil of wire. The winding is wrapped around a metallic core. The windings 103 can be divided into pairs of diametrically opposite windings 103A-C, each winding 103 in the pair being arranged to form an opposite pole to the other when energised by the control module 109 (not shown in FIGS. 2 and 3, but described with reference to FIG. 4 below). Within each pair of windings, the winding for forming one pole is indicated by the light-coloured wires, and the winding for forming the opposing pole is indicated by dark-coloured wires.

Figure 3:
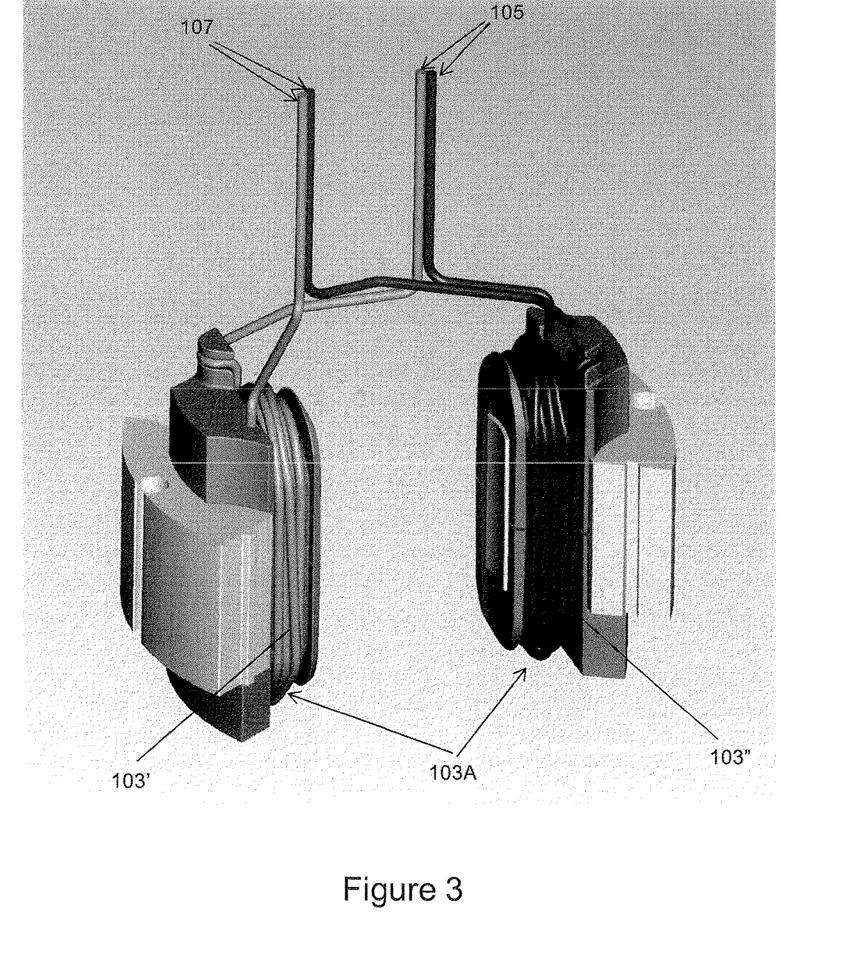
FIG. 3 is a perspective view of first and second windings (forming a pair of windings) in the stator assembly of FIG. 2.

Each winding has an input termination 105 and an output termination 107 (the designation as input or output being dependent on the direction of current flow around the winding). In contrast to the stator assembly of FIGS. 1a and 1b, the terminations (also referred to as terminals) of each winding are located remotely from the winding. This is most clearly shown in FIG. 3, which shows a pair 103A of windings in isolation. Referring now to FIG. 3, the pair 103A comprises a first winding 103' (on the left) and a second winding 103" (on the right). The terminations 105, 107 from the first winding 103' extend in a substantially circumferential direction around the circle, in a clock-wise direction such that both the input 105 and the output 107 terminations are remote from the winding 103'. The terminations on the second winding 103" also extend the same manner, but in an anti-clockwise direction. Thus, the input terminations 105 for the first and second windings 103', 103" in the pair 103A are located directly adjacent one another and the output terminations 107 of the first and second windings 103', 103" are also located directly adjacent one another.

As well as the common terminations 105, 107 within each pair of windings 103A-C being located directly adjacent one another, the two pairs of terminations for each pair of windings (i.e. the pair of input terminations 105 and the pair of output terminations 107) are located adjacent to each other (but not directly adjacent to each other since they are circumferentially spaced apart). The two pairs of terminations for each pair of windings 103A-C are nevertheless sufficiently adjacent that the pairs of terminations, are positioned sequentially around the circle of the stator assembly (see FIG. 2).

Figure 4:
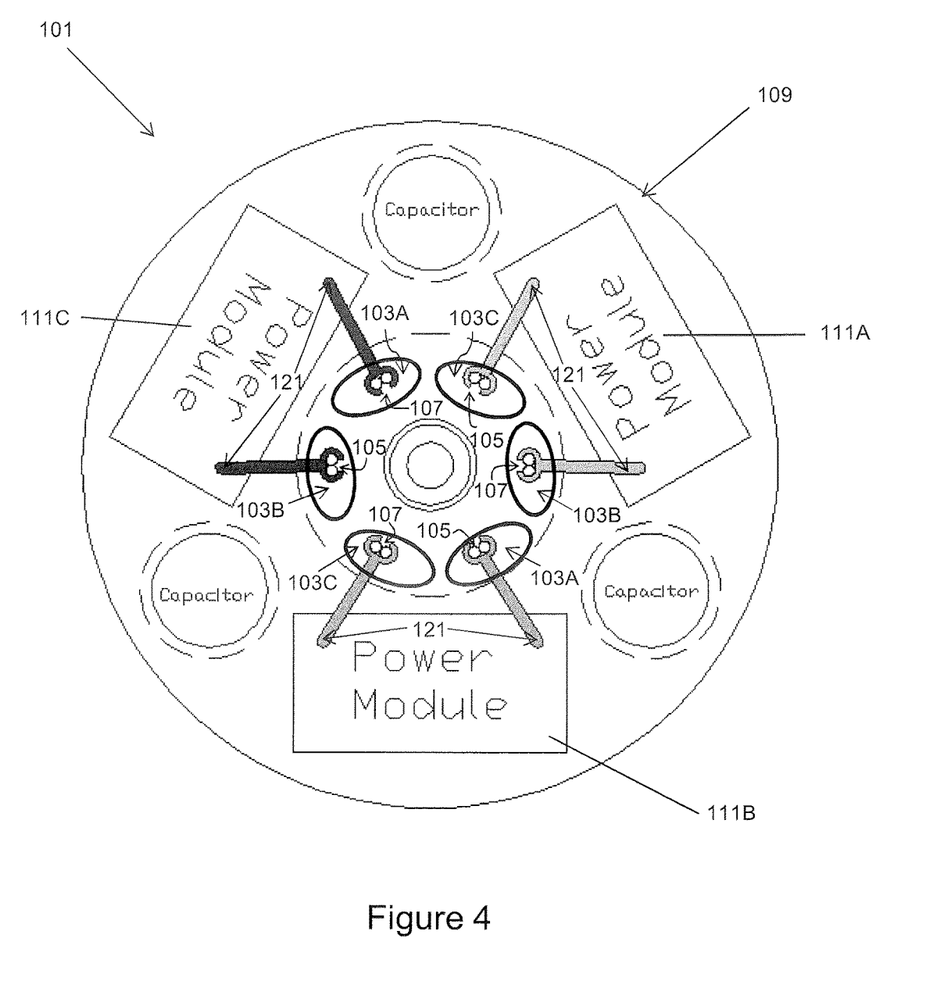
FIG. 4 is a schematic plan view of the stator assembly of FIG. 2, also showing a control module.

Arranging the terminations in this manner has been found to be especially advantageous as now explained with reference to FIG. 4 and contrasting it with FIG. 1b. FIG. 4 shows the stator assembly 101 of the first embodiment in combination with a control module 109. The control module 109 comprises a microprocessor (not shown) for determining and controlling the sequence of energising the windings 103, three power control modules 111A-C each being arranged to supply power to one of the pairs of windings 103A-C. In contrast to the control module shown in FIG. 1b, the control module 109 in the first embodiment of the invention does not comprise a complex and overlapping tracking arrangement. Instead, the input 105 and output 107 terminations for each pair of windings 103A-C are paired directly adjacent one another, to allow simultaneous connection to the I/O terminals 121 of the respective power module 111A-C to the two input terminations 105 and the two output terminations 107. Furthermore, since the two pairs of terminations for each pair of windings (i.e. the pair of input terminations 105 and the pair of output terminations 107) are located adjacent to each other, the power module 111 A-C can be positioned in close proximity to both pairs of terminations for each pair of windings, thereby obviating the need for long or complex tracking.

Figure 5A:
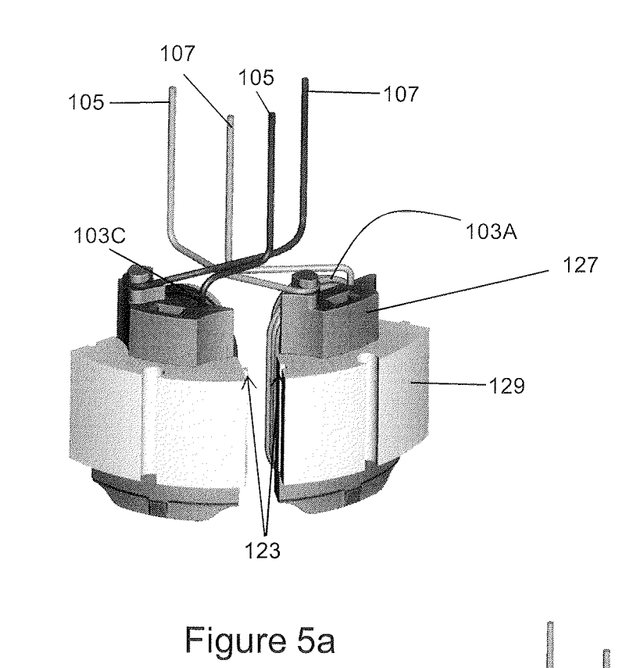
FIGS. 5a-e are a perspective views showing how the stator assembly of the first embodiment of the invention is constructed.
Figure 5B:
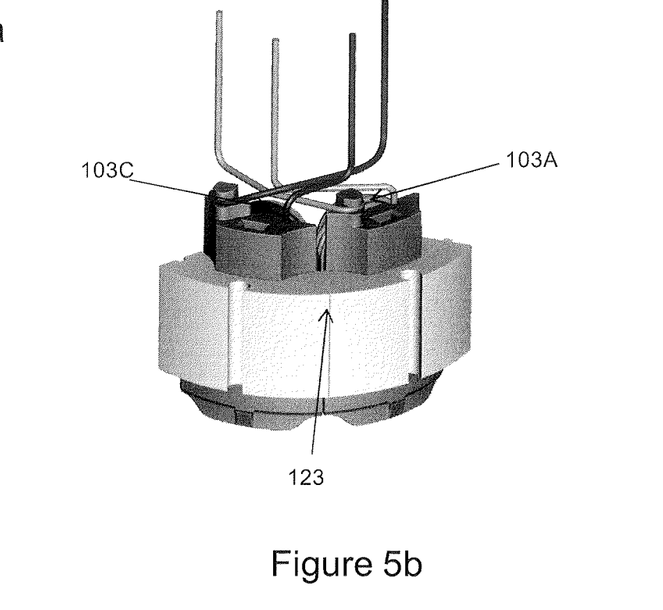
Figure 5C:
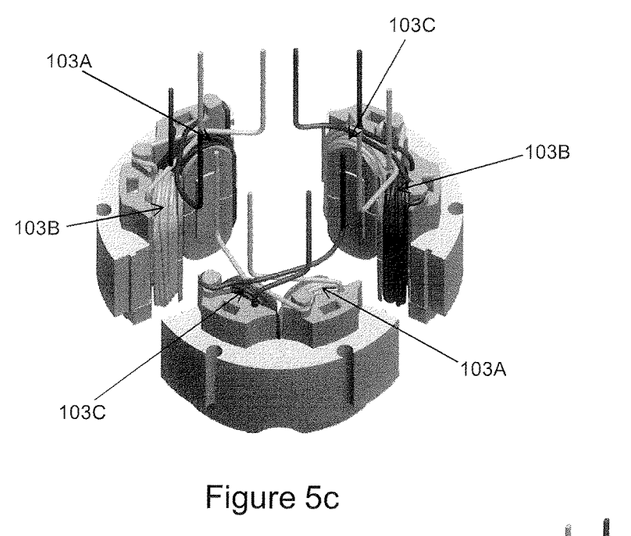
Figure 5D:
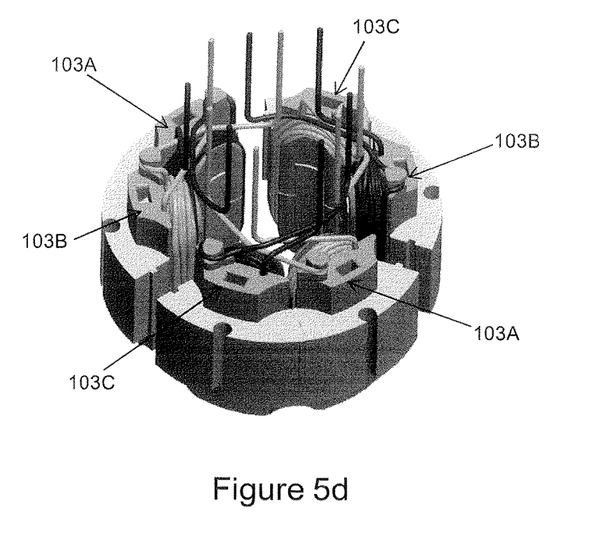
Figure 5E:
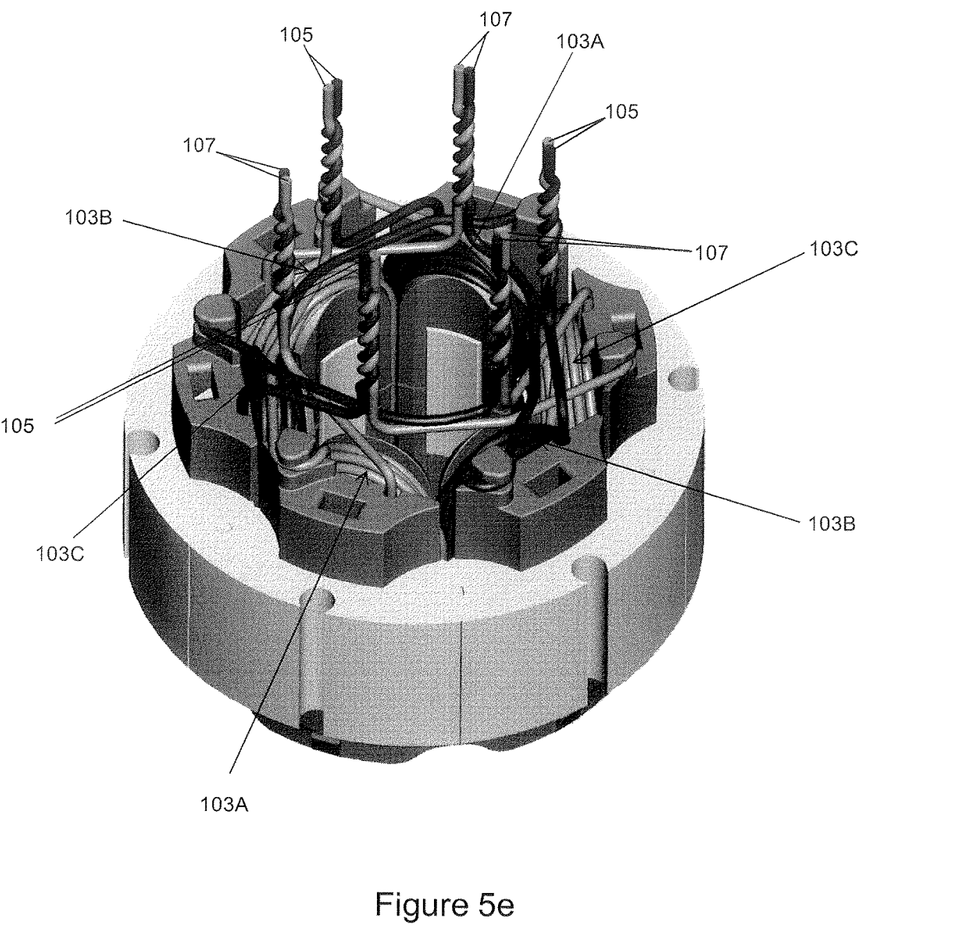

FIGS. 5a to 5e, show the stator assembly in different stages of construction. FIG. 5a shows two adjacent windings (a first winding from pair 103A, and a second winding from pair 103B). Each winding is formed by a coil of wire. The winding is wrapped around a metallic core 127. A support structure 129 is attached to the radially outer surface of the core 127 (for the sake of clarity, the coil 125, core 127 and support structure 129 are only labelled for one of the windings in FIG. 5a). The support structure attached to the cores around which the respective windings are wrapped, are connected together using a tongue and groove arrangement 123 (see FIG. 5b). Two additional sets of windings are connected together in a similar fashion and then arranged to form a circle of six windings (see FIGS. 5c and 5d). All the windings are then connected together. The windings diametrically opposite one another each define a pair of windings 103A-C. The end of the input and output wires extending from each winding define, respectively, input and output terminations 105, 107. These terminations are arranged such that when the windings are arranged in the circle, the input terminations 105 for the windings in each pair are located adjacent one another and the output terminations 107 for the windings in each pair are located adjacent one another. As shown in FIG. 5e, once the windings are connected together, the two input wires for each pair of windings are intertwined and the two output wires for each pair of windings are intertwined (for the sake of clarity, the wires are not shown as intertwined in FIG. 2).

Figure 6:
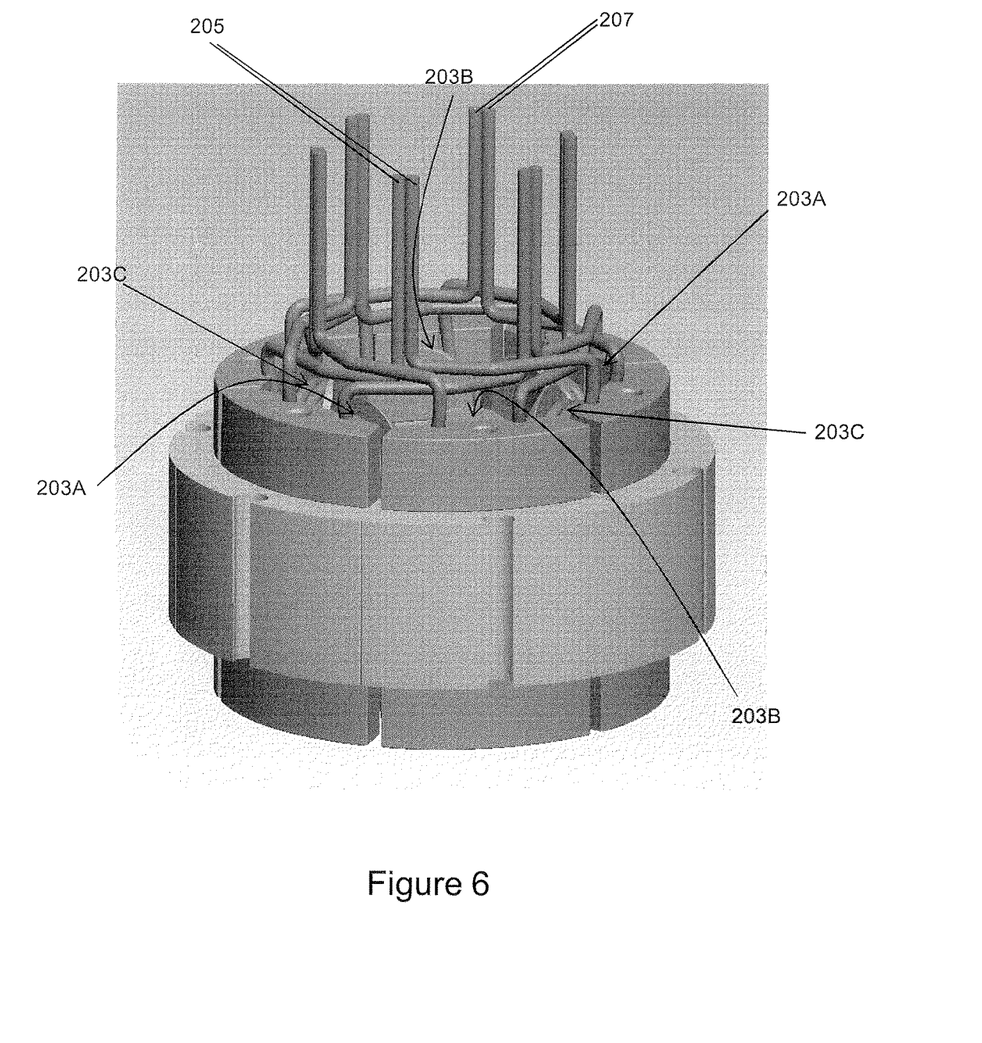
FIG. 6 is a stator assembly according to a second embodiment of the invention.
Figure 7:
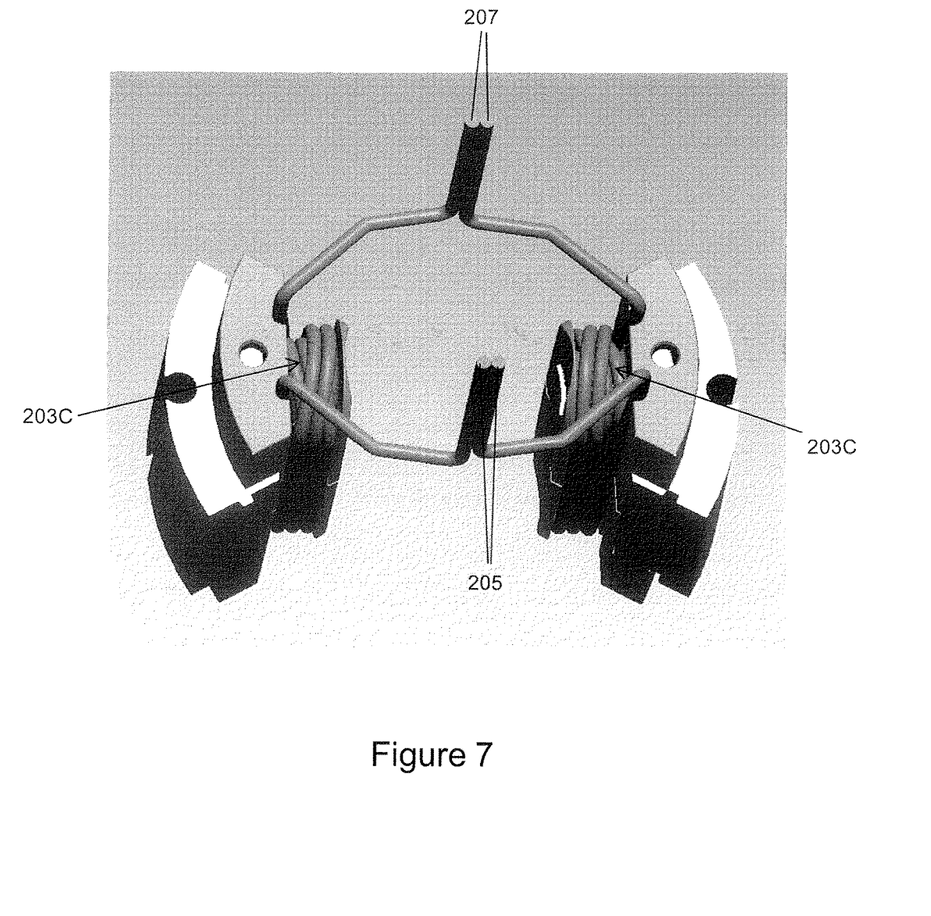
FIG. 7 is a perspective view of first and second windings (forming a pair of windings) in the stator assembly of FIG. 6.

A second embodiment of the invention is shown in FIGS. 6 and 7. The second embodiment is the same as the first except that that the wires extend in a different direction from the windings such that the pairs of terminations are differently positioned relative to the windings.

The stator assembly of the second embodiment of the invention comprises three pairs of windings 203A-C, each pair being formed of diametrically opposite windings. As best shown in FIG. 7, and in contrast to the first embodiment of the invention, the wires from each winding 203 extend in substantially opposite circumferential directions. The first winding in each pair and the second winding in each pair are mirror-images of one another, such that the input terminations 205 for each pair are directly adjacent to one another and the output terminals 207 for each pair are directly adjacent to one another (for clarity only the two pairs of terminations for a single pair of windings 203C are shown in FIG. 6). Such an arrangement enables the terminations in each pair of terminations to be simultaneously connected by a single connector from a power module (not shown).

Whilst the present invention has been described and illustrated with reference to particular embodiments, it will be appreciated by those of ordinary skill in the art that the invention lends itself to many different variations not specifically illustrated herein. Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. An electric supercharger comprising a motor, the motor comprising:
    a stator assembly comprising a plurality of pairs of windings, each pair of windings comprising a first winding for forming a first pole and a second winding for forming a second, opposite, pole, each winding having an input termination and an output termination,
    wherein the terminations of each pair of windings are arranged such that the input terminations for the first and second windings are located adjacent one another and the output terminations of the first and second windings are located adjacent one another.

2. The supercharger according to claim 1, wherein the first and second windings are located opposite one another.

3. The supercharger according to claim 1, wherein the two pairs of terminations for each pair of windings are located adjacent to each other.

4. The supercharger according to claim 1, wherein the input terminations for the first and second windings are directly adjacent to one another, and the output terminations for the first and second windings are directly adjacent to one another.

5. The supercharger according to claim 4, wherein the input terminations for the first and second windings are electrically connected together, and the output terminations for the first and second windings are electrically connected together.

6. The supercharger according to claim 1, wherein the motor is a switched reluctance motor (SRM), and the motor includes a control module for selectively energising each of the pairs of windings in the stator assembly.

7. The supercharger according to claim 6, wherein the control module comprises a plurality of power modules, each power module being arranged to supply power to one of the pairs of windings.

8. The supercharger according to claim 1, wherein the windings are arranged in a circle with the first and the second windings in each pair being diametrically opposite one another.

9. The supercharger according to claim 8, wherein the input and output terminations for each winding are on the end of respective input and output wires to/from the winding, and the input and output wires of each winding extend in a substantially circumferential direction such that the termination is circumferentially remote from its respective winding.

10. The supercharger according to claim 8, wherein the terminations are positioned radially inwardly of the windings.

11. A stator assembly for use in an electric supercharger, the stator assembly comprising:
   a plurality of pairs of windings, each pair of windings comprising a first winding for forming a first pole and a second winding for forming a second, opposite, pole, each winding having an input termination and an output termination,
   wherein the terminations of each pair of windings are arranged such that the input terminations for the first and second windings are located adjacent one another and the output terminations of the first and second windings are located adjacent one another.

* * * * *